Patented Mar. 15, 1938

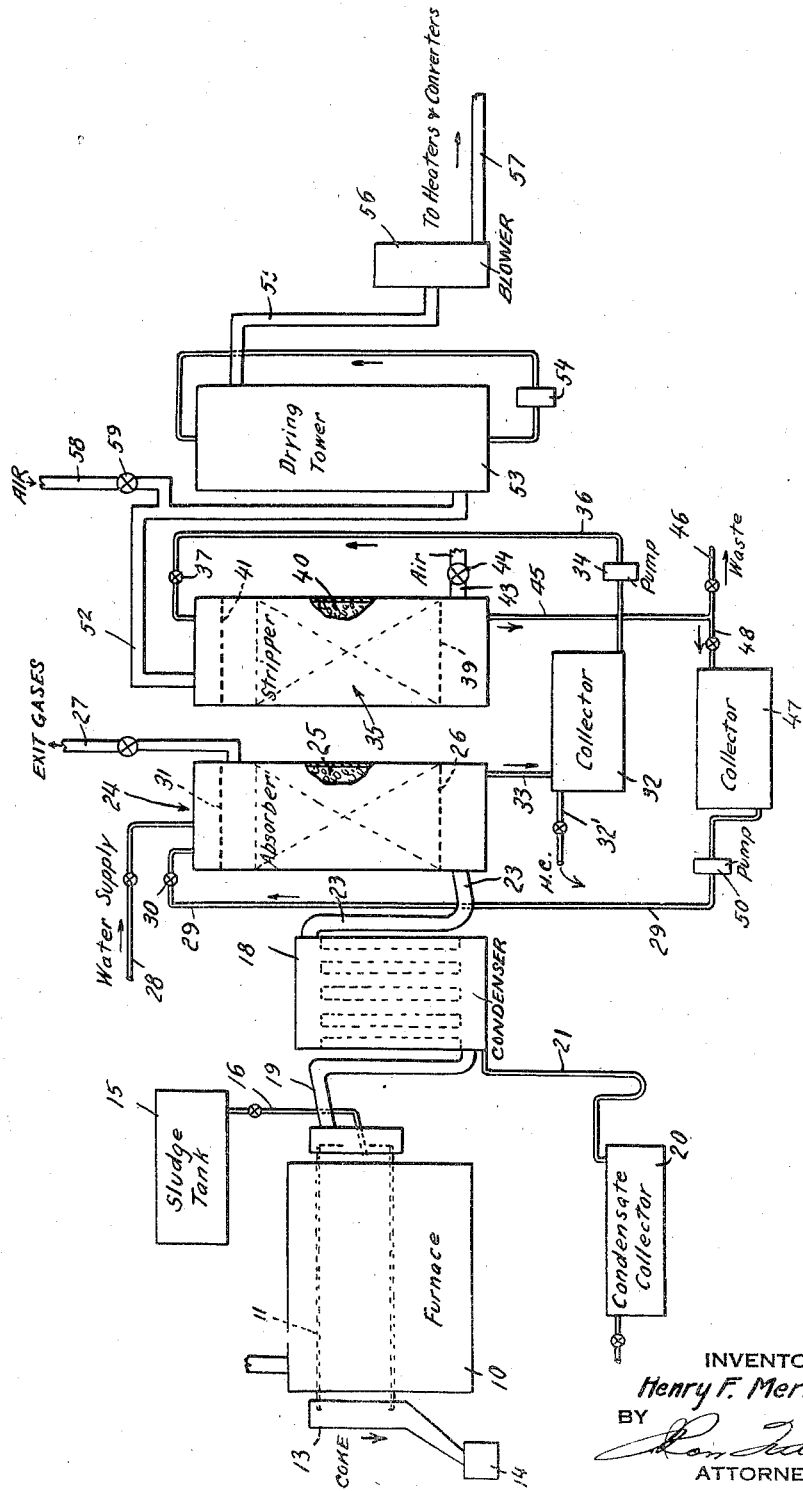

2,111,389

UNITED STATES PATENT OFFICE 2,111,389

PURIFICATION AND CONCENTRATION OF SULPHUR DIOXIDE OBTAINED FROM ACID SLUDGE

Henry F. Merriam, West Orange, N. J., assignor to General Chemical Company, New York, N. Y., a corporation of New York Application June 30, 1932, Serial No. 620,083

1 Claim. (Cl. 23—178)

This invention relates generally to the manufacture of sulphuric acid. More particularly, the invention is directed to a method for producing a gas mixture rich in sulphur dioxide, and containing sulphur dioxide and oxygen in proportions suitable for conversion to sulphur trioxide by the contact process, employing as a source of sulphur dioxide, sulphuric acid sludges constituting waste products of numerous processes for refining of oils, for instance petroleum.

Several methods have heretofore been proposed for utilizing sulphur and sulphur compounds of acid sludges, and with this in view it has been suggested to decompose the acid sludge by heating to produce gas mixtures containing sulphur dioxide, and then converting the sulphur dioxide so obtained to sulphur trioxide by the contact process. In prior proposals difficulties have been encountered largely on account of the deleterious effects on catalysts employed of impurities, particularly organic impurities, usually contained in such gas mixtures because of the source thereof.

The principal object of the present invention resides in the provision of a method for recovering sulphur and sulphur compounds from acid sludges, and preferably producing therefrom a sulphur dioxide-oxygen gas mixture particularly adapted for conversion to sulphur trioxide by the contact process and having a sulphur dioxide concentration considerably in excess of that of gas mixtures ordinarily employed in the contact process and obtained, for example, by roasting sulphide ores or by burning brimstone. A further aim of the invention is the provision of a process for purifying sulphurous gases derived from the decomposition of acid sludge by which process gaseous impurities, particularly those of organic nature, are substantially completely removed from the sulphur dioxide whereby poisoning of the catalytic material in the converters is avoided. The invention additionally comprehends a method for purifying acid sludge gases containing comparatively large quantities of sulphur dioxide together with gaseous impurities involving substantially complete separation or extraction of sulphur dioxide from the gas mixture and from the gaseous impurities contained therein, and the ultimate production of a gas mixture containing sulphur dioxide and oxygen in proportions suitable for conversion to sulphur trioxide by the contact process.

According to one preferred embodiment, the invention comprises the decomposition of acid sludge by heating, in the absence of any substantial quantities of oxygen, to produce a gas mixture containing sulphur dioxide and water vapor as the chief constituents together with smaller quantities of hydrocarbon vapors and other gaseous impurities. The hot gas mixture is cooled to condense and separate therefrom the major portions of water and hydrocarbons. The cooled gas mixture is contacted with an absorbing medium adapted to selectively absorb sulphur dioxide and separate the same from the gas stream and the gaseous impurities thereof. The absorbed sulphur dioxide is then stripped from the absorbent by blowing with air in such quantities as to produce a sulphur dioxide-air gas mixture sufficiently dilute in sulphur dioxide to permit conversion of the sulphur dioxide to sulphur trioxide by the contact process, but yet containing substantially the maximum convertible quantities, in proper proportions, of sulphur dioxide and oxygen.

A further appreciation of the objects and advantages of the invention may be had from a consideration of the following detailed description taken in connection with the accompanying drawing which illustrates diagrammatically one form of apparatus for carrying out a preferred embodiment of the process constituting the invention.

Referring to the drawing, the reference numeral 10 indicates the combustion chamber of a furnace adapted to burn coal, coke, oil, natural gas or other fuel. Mounted in the combustion chamber 10 is a decomposing kiln or retort 11 of any known construction and provided with suitable mechanism, such as a screw conveyor not shown, to facilitate discharge of coke therefrom. The specific construction of the furnace constitutes no part of the present invention except that one preferred embodiment of the process contemplates the use of an externally heated kiln constructed so as to substantially exclude air therefrom.

One end of the kiln 11 is provided with a gas outlet 19. The opposite end of the kiln projects into a header 13 into which the solid residue of the decomposition of the acid sludge is continuously discharged. Header 13 is provided with an air-lock 14 through which coke may be withdrawn without admitting air to the kiln. Acid sludge is run into the kiln from a supply tank 15 through a valve-controlled pipe 16, the lower end of which projects into the end of the kiln.

The gas outlet conduit 19 is connected to the lower end of a cooler or condenser 18. The condenser may be of any suitable construction, either air or water cooled, and controlled so as to reduce the temperature of gas passing therethrough to substantially normal to thereby effect condensation of the bulk of the water vapor and a large proportion of the condensable hydrocarbons contained in the gas. The condensate from the cooler is drained into a collector 20 through a pipe connection 21 having a liquid seal therein. The gases uncondensed in the cooler pass through conduit 23 and are charged into the lower end of an absorber indicated generally by the reference numeral 24.

A horizontal perforated plate 26, in the lower end of the absorber 24, supports a body of packing material 25, for example quartz pebbles, coke, etc., the upper surface of which lies slightly below the inlet end of an exit gas offtake 27. Absorbing liquid, such as water, is introduced into the upper end of the absorber through a valve-controlled inlet pipe 28, or through an inlet pipe 29 having therein a valve 30. The liquid fed into the absorber flows over a perforated plate 31 by means of which the liquid is distributed evenly over the upper surface of the packing 25. The absorbing liquid runs downwardly over the packing and intimately contacts the upwardly flowing gas stream. The liquid and the absorbed gases therein run out of the lower end of the absorber and are drained into a collector 32 through the pipe connection 33. Collector 32 is provided with a valved tap 32', through which any oils rising to the surface of the absorbing liquid in collector 32 may be conveniently drawn off.

The liquid from the collector 32, containing absorbed gases, is fed by a pump 34 into the upper end of a stripping tower 35 through pipe 36 provided with a control valve 37. The construction of the stripper 35 is substantially the same as that of the absorber 25, and includes a perforated plate 39 near the lower end of the tower for supporting packing material 40. The liquid introduced into the stripper through pipe 36 is flowed over the upper surface of the packing 40 by a distributing plate 41. An air inlet connection 43, having a control valve 44, opens into the stripping chamber beneath perforated plate 39. The stripped absorbing liquid flows out of the stripping tower through a pipe connection 45 and may be run to waste through outlet 46 or into tank 47 through pipe 48. Where the stripped absorbing medium is recirculated through the system, it is fed back into the absorber 24 from tank 47 through pipe 29 by pump 50.

The gases leaving the upper end of the stripper are conducted through a conduit 52 into the lower end of drying tower 53 which may be of any suitable construction such as employed in the manufacture of sulphuric acid. The reference numeral 54 indicates generally apparatus for circulating drying acid through the drying tower. Dried gases are withdrawn from the upper end of the drying tower through a conduit 55 by blower 56 which discharges into a main gas line 57 through which the gases are conducted to the heaters and converters of a contact sulphuric acid plant. Provision is made for introducing diluting air into the gas stream between the stripper and drying tower by means of an inlet pipe 58 connected to the conduit 52 and having a control valve 59 therein.

One preferred embodiment of the invention may be carried out substantially as follows:

The burners in the furnace 10 are so adjusted as to maintain within the kiln 11 temperatures of preferably not substantially less than about 400° F., and generally between 400 and 600° F. Acid sludge, obtained from the refining of oils, for instance petroleum, and containing for example 45% sulphuric acid, 20% oils and tarry hydrocarbons, and 35% water, is continuously fed into the kiln from supply tank 15 through the pipe connection 16. The sludge is decomposed in the kiln by the action of the heat, and the sulphuric acid of the sludge is reduced to sulphur dioxide primarily by the hydrogen of the hydrocarbons contained in the sludge. The rate of rotation of the screw conveyor and the quantity of sludge fed into the kiln are so adjusted that substantially all of the sulphuric acid is reduced during the passage of the sludge through the kiln, and sulphur dioxide is produced. Coke is continuously discharged from the kiln into the drum 13.

The gas resulting from the decomposition of the sludge in the kiln contains principally sulphur dioxide and water vapor, and smaller quantities of hydrocarbons, carbon dioxide, carbon monoxide, nitrogen and oxygen. As previously noted, according to one preferred embodiment of the process, the decomposition of the sludge is effected in the kiln substantially in the absence of air. Hence, burning of carbonaceous matter of the sludge and dilution of the gas evolved is prevented to a large degree. The sulphur dioxide gas mixture leaving the kiln may contain, for example, as high as 15% by volume sulphur dioxide, the remainder being largely water vapor.

The hot gaseous products of the decomposition of the sludge are withdrawn from the kiln and conducted through conduit 19 into the condenser 18 in which the gases are cooled to substantially normal temperatures. During such cooling, substantially all of the water vapor and the major portion of the hydrocarbons are condensed out of the gas stream. The condensate of cooler 18, containing varying proportions of water and liquid hydrocarbons, is drained into the collector 20, in which water and oil may be separated by decantation or otherwise. On account of the separation of water and hydrocarbons from the gas stream, the sulphur dioxide concentration of the latter is increased, and the sulphur dioxide content of the gases passing through conduit 23 into the absorber 24 may run as high as 75-99%.

During upward passage through the absorber, the gases are intimately contacted with absorbing liquid, such as water or weak sulphurous or sulphuric acid, flowing downwardly over the packing. The absorbing liquid is introduced into the absorber through inlet pipes 28 or 29 at substantially normal temperature, and the quantity of such liquid is so regulated as to provide for the substantially complete absorption of sulphur dioxide from the gas stream. The absorption operation thus effects removal of the sulphur dioxide from the gas stream, and the separation of the sulphur dioxide from gaseous impurities, such as uncondensed hydrocarbons and other gaseous impurities which deleteriously affect the activity of catalysts, particularly platinum. Gaseous impurities are discharged from the system through outlet pipe 27.

The absorbing liquid, containing for example around 6% sulphur dioxide and possibly some small quantity of condensed hydrocarbons, runs out of the bottom of the absorber and into the collector 32. Any liquid hydrocarbons in the absorbing liquid rise to the surface thereof, and may be tapped off through outlet 32', thus avoiding possible contamination, by organic matter, of the gas stream leaving the stripper 35. The liquid is then pumped through pipe 36 into the upper end of the stripping tower 35. The water or weak acid, containing the absorbed sulphur dioxide, runs downwardly over packing 40 and is intimately contacted with an upwardly flowing stream of air or oxygen containing gas drawn into the system by the blower 56 through the inlet 43 near the lower end of the stripping tower.

The quantity of air drawn into the stripper through the inlet 43 may, in some instances, be so regulated by adjustment of valve 44 that the sulphur dioxide concentration of the sulphur dioxide-air gas mixture leaving the upper end of the stripper through the outlet pipe 52 is as high as 60%. This procedure may be followed where it is desired to obtain for any purpose a gas mixture having a sulphur dioxide concentration higher than would ordinarily be employed in the manufacture of sulphur trioxide by the contact process.

In the operation of the preferred embodiment of the process, valve 44 is adjusted to permit admission to the stripper of a greater quantity of air than that actually required to effect reasonably complete separation of sulphur dioxide from the absorbing liquid, but at the same time, the quantity of air thus admitted to the stripper is so limited as to provide in the conduit 52 a gas mixture containing approximately maximum convertible quantities, in proper proportions, of sulphur dioxide and air, the sulphur dioxide concentration of the gas mixture being, for example, in the neighborhood of 20–25%. Such gas mixture is approximately the strongest sulphur dioxide-air gas mixture which may be produced and have available in the mixture sufficient oxygen for conversion of the sulphur dioxide to sulphur trioxide by the contact process and also have present in the exit gas from the contact system, say, 10–5% oxygen after sulphur trioxide absorption as is often desired in commercial operations.

Thus it will be seen, the stripping operation is carried out in such manner that not only is an effective separation of the absorbed sulphur dioxide from the absorbing liquid obtained, but the composition of the exit gas of the stripper is at the same time so controlled as to provide in a sulphur dioxide-air gas mixture, maximum quantities of sulphur dioxide and oxygen, in proper proportions, convertible to sulphur trioxide by the contact process. Further, since larger quantities of air are passed through the stripper than would ordinarily be needed to bring about substantially complete separation of the sulphur dioxide and the absorbing liquid, it will be seen that larger quantities of absorbing liquid may be circulated through the absorber and thereby cause a more efficient absorption of sulphur dioxide from the gas stream.

The absorbing liquid running out of the stripper through the pipe 45 generally contains substantially no sulphur dioxide and may, where water is employed, be turned to waste through outlet 46. However, in some instances, if it is desired to retain in the system such small quantities of sulphur dioxide as the stripped absorbing medium may contain, the liquid is collected in tank 47 and reintroduced into the absorber 24 by the pump 50 through pipe 29. Although the invention contemplates normal temperatures both in the absorber and in the stripper, it will be understood, that still more efficient absorption of sulphur dioxide may be obtained by cooling the absorbing liquid prior to the introduction thereof into the absorber, and that a more efficient extraction of the sulphur dioxide from the absorbing liquid may be obtained in the stripper by conducting the stripping operation at elevated temperatures either by heating the liquid prior to its introduction into the stripper, or by heating the air drawn in through the inlet pipe 43, or otherwise.

The strong sulphur dioxide exit gas of the stripper is conducted into the lower end of the drying tower 53 through conduit 52. Suitable quantities of drying acid are passed through tower 53 by the circulating system 54, and the gas mixture, thus dried in known manner, is withdrawn from the drying tower and pumped into the main gas line 57 by the blower 56. The gas mixture is thence conducted through the usual heaters to the converters for conversion of the sulphur dioxide to sulphur trioxide. Because of the purification system described, substantially all gaseous impurities, and particularly organic impurities, have been eliminated from the system so that conversion of the sulphur dioxide to sulphur trioxide may be effected by a platinum catalyst, or other catalyst readily susceptible to poisoning by organic impurities in the gas.

According to one modification of the invention, the decomposition of the acid sludge may be carried out in a kiln by heating the sludge in the presence of hot combustion gases. When so operating, the gases resulting from the decomposition of the sludge are, broadly speaking, of the same general composition as the gases obtained when conducting the process in accordance with the preferred embodiment of the invention except that the sulphur dioxide content of the exit gas of the kiln may be lower because of dilution by the combustion gases. It will be understood, of course, that the composition of the exit gases of the decomposing kiln depends also on the nature of the sludge employed.

Generally considered, the operation of the modified form of the process, is substantially the same as already described in connection with the preferred embodiment, except that the quantity of air admitted to the stripper through the inlet 43 is adjusted in accordance with the sulphur dioxide content of the gases produced by the decomposition of the sludge. For example, where the gases entering the absorber through the pipe connection 23 contain less than say 20–25% sulphur dioxide, the valve 44 is adjusted so as to admit to the stripper the minimum amount of air necessary to effect separation of the sulphur dioxide from the absorbing liquid, to thus obtain the maximum sulphur dioxide concentration of the exit gas of the stripper. In this instance, the sulphur dioxide content of the exit gas of the stripper would probably be a few percent less than that of the gas entering the absorber.

In cases where the gas from the decomposition kiln 11 contains large quantities of sulphur dioxide and separation of sulphur dioxide from the absorbing medium is effected in the stripper by blowing with a minimum quantity of air, or in any situation where the exit gas of the stripper is too rich, proper dilution may be had by opening valve 59 in the inlet pipe 58 to permit the blower 56 to draw into the system the additional quantities of air required.

The sulphur dioxide gas obtained by the present process need not of course necessarily be employed in the manufacture of sulphuric acid. Where stripping is effected in tower 35 by blowing with a minimum quantity of air necessary to effect extraction of sulphur dioxide from the absorbing medium, the sulphur dioxide concentration of the gas mixture in the conduit 52 may run as high as 60%. Obviously, this gas may be used without dilution in situations where a highly concentrated sulphur dioxide gas is desired. Further, the relatively high sulphur dioxide content of the absorbing liquid may be removed therefrom, for example by boiling, and utilized for making liquid sulphur dioxide.

Instead of absorbing the sulphur dioxide in a liquid such as water or weak acid, solid adsorbents such as silica gel may be employed for separating the sulphur dioxide from gaseous impurities. When solid adsorbents are utilized, the sulphur dioxide may be released therefrom in any suitable manner, for example by heating or by stripping by means of hot air.

The main advantages of the invention, however, relate to the recovery of sulphur compounds from sludge acid, and the subsequent utilization of such compounds in the manufacture of sulphuric acid by the contact process. Because of the method of carrying out the decomposition of the sludge by heating in the substantial absence of oxygen, the sulphur dioxide content of the exit gas of the decomposing kiln is high and is considerably in excess of the sulphur dioxide content of the gases obtained by roasting sulphide ores or burning brimstone. On account of the absorption of the sulphur dioxide from the decomposing kiln in a suitable absorbent, the sulphur dioxide is economically separated from the gas stream, and the gaseous impurities, particularly organic impurities, are discharged from the system. Since deleterious gaseous impurities are thus removed, conversion of the sulphur dioxide to sulphur trioxide may be effected by the use of platinum or other easily poisoned catalysts. Further, in accordance with the preferred mode of stripping the absorbing liquid, the purification phase of the process is completed, and there is produced a sulphur dioxide gas mixture considerably richer in sulphur dioxide than could be obtained by the usual methods of roasting sulphide ores or burning brimstone, and containing substantially the maximum convertible quantities, in proper proportions, of sulphur dioxide and oxygen.

I claim:

The method of producing a sulphur dioxide gas mixture which comprises heating acid sludge, comprising a source of sulphur dioxide, condensable vapors and hydrocarbons, to a temperature sufficient to decompose the sludge, to form a hot gas mixture containing sulphur dioxide, cooling the gas mixture to separate condensable vapors therefrom, contacting the cooled gas mixture with an absorbent liquid adapted to absorb sulphur dioxide and separate the same from the gas mixture, separating hydrocarbons from the absorbent liquid, and stripping the sulphur dioxide from the absorbent liquid by contacting air therewith whereby a gas mixture containing sulphur dioxide and oxygen is obtained.

HENRY F. MERRIAM.